Sept. 22, 1964  A. P. WILSKA  3,150,259
ELECTRON MICROSCOPE SPECIMEN HOLDER WITH MEANS
FOR ADJUSTMENT IN TWO DIRECTIONS
Filed July 5, 1962  2 Sheets-Sheet 1
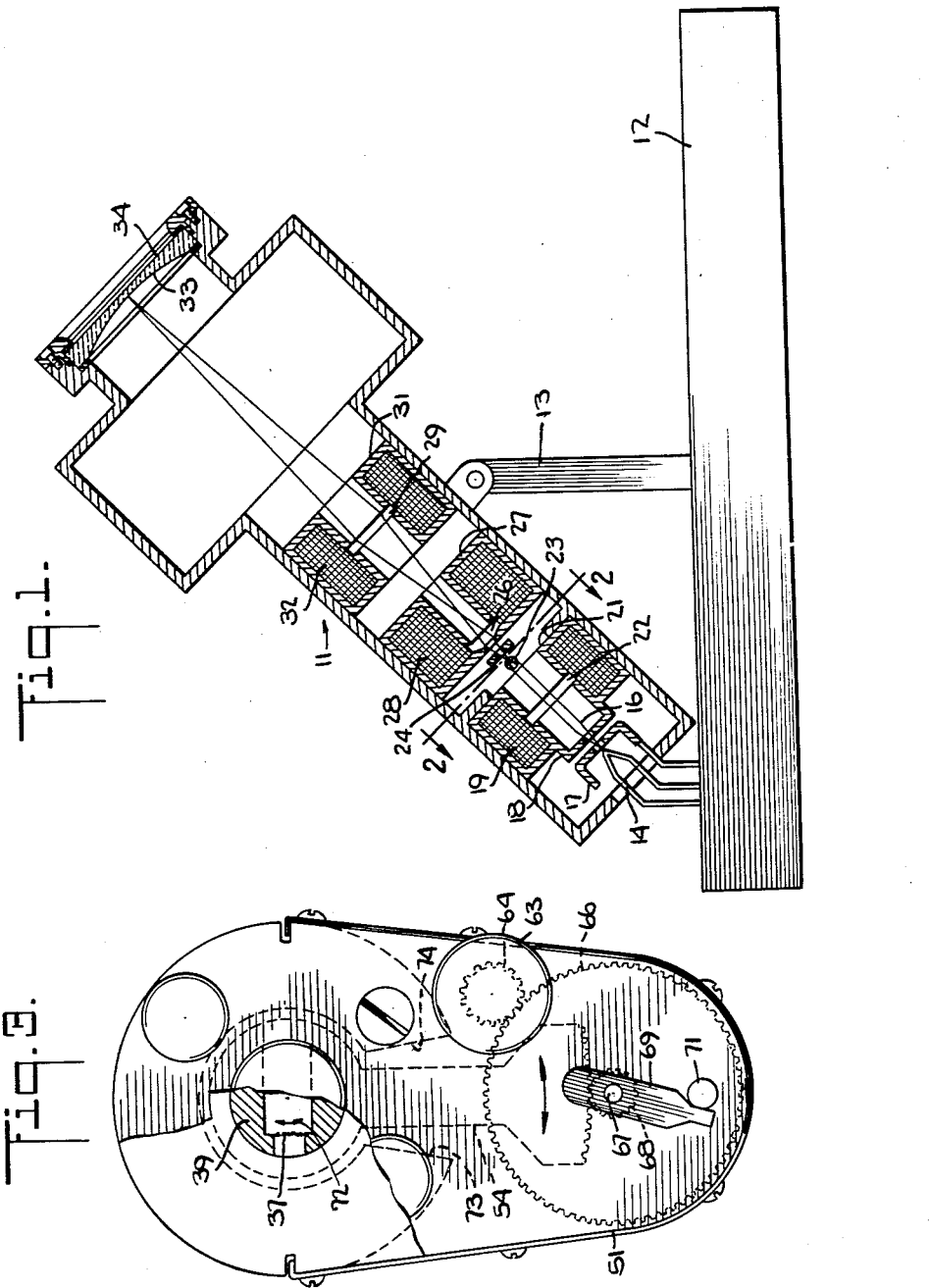
INVENTOR.
ALVAR P. WILSKA
BY
ATTORNEYS

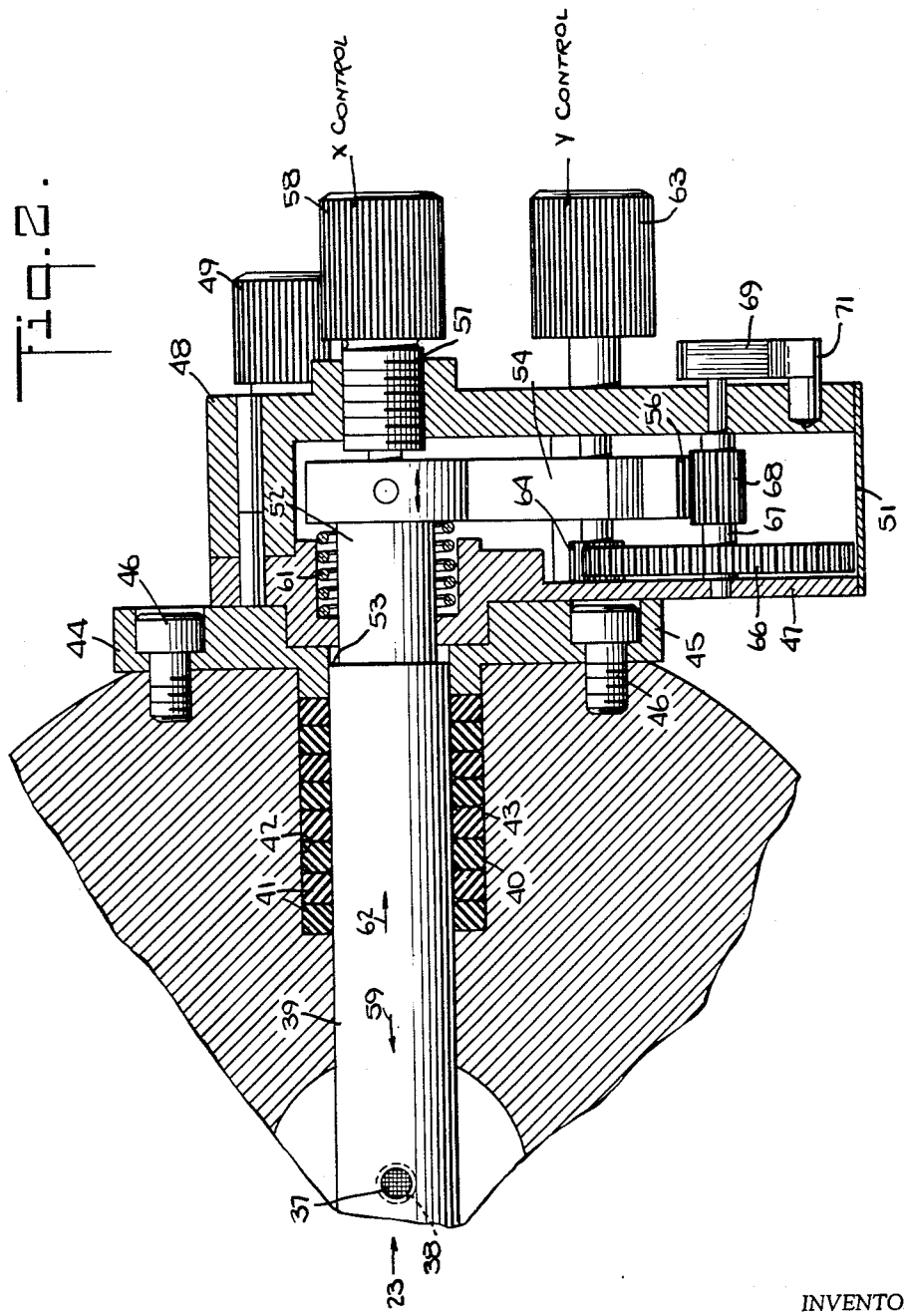

ID
3,150,259
ELECTRON MICROSCOPE SPECIMEN HOLDER WITH MEANS FOR ADJUSTMENT IN TWO DIRECTIONS
Alvar P. Wilska, Tucson, Ariz., assignor to Philips Electronics and Pharmaceutical Industries Corp., New York, N.Y., a corporation of Maryland
Filed July 5, 1962, Ser. No. 207,693
1 Claim. (Cl. 250—49.5)

This invention relates to means for holding a specimen in an electron microscope and particularly to a holder which permits only a small amount of air to enter the evacuated space within the microscope while the specimen is being changed. In addition, the invention relates to means for moving the specimen in two perpendicular directions to locate it properly with respect to the electron beam.

The holder of this invention comprises a precisely ground, round rod which extends through the wall of the microscope into the inner part of the microscope column where the axis of the electron beam (and of the column) is located. The specimen itself is actually supported on a suitable platform located in a hole that extends perpendicularly through the rod. The space between the rod and the wall of the microscope is sealed by gasket means, such as one or more O-rings, and the length of the rod is sufficient to permit one end of the rod, which always extends outside of the microscope, to be pulled out of the microscope still further and to such a distance as will permit the hole where the specimen itself is located to be outside of the microscope, without having the other end of the rod drawn beyond the sealing means. Then, when the new specimen is inserted into the hole and the rod is returned to its operating position within the microscope, the only air that will have been admitted by this procedure is the air trapped within the hole itself. This small volume of air can be easily removed by the pumps of the microscope.

In order to move the specimen during an examination of the electron microscope image, one end of the specimen-supporting rod is provided with a gear segment which meshes with other gears of the train to permit the rod to be rocked back and forth slightly about its own axis, which is perpendicular to the axis of the electron beam. This rocking motion, though slight, is sufficient to move the specimen back and forth to a limited extent, determined by the distance between the center of the rod and the location of the specimen itself. Motion in the perpendicular direction, i.e., in the longitudinal direction of the rod, may be accomplished by a balance of pressure upon the end of the rod and counter-pressure from a spring.

The invention will be described in greater detail in connection with the drawings, in which:

FIG. 1 shows a simplified cross-sectional view of an electron microscope according to the invention;

FIG. 2 shows an enlarged cross-sectional view of the specimen holder of the microscope shown in FIG. 1; and FIG. 3 shows an end view of the specimen holder shown in FIG. 2.

The electron microscope of FIG. 1 is of the type shown and described in my copending application entitled "Column for Electron Microscopes" and filed concurrently herewith. The microscope 11 is supported on a base 12 by means of a pivoted arm 13 to tilt the microscope to any convenient angle. The internal elements of the microscope comprise a filamentary cathode 14 which is the source of electrons out of which an electron beam 16 is formed. The beam is initially formed by the electrostatic fields of the filament 14, a grid 17, an anode 18, and a coil 19, which, almost completely enclosed by a ferromagnetic shell 21, establishes a magneic field across a gap 22 in the shell, thus acting as a condenser lens upon the electron beam 16.

The electron beam after passing through the condenser lens gap 22 strikes a specimen (not shown) within a rod-like specimen holder 23. The specimen holder will be described in greater detail hereinafter.

After illuminating the specimen, the electron beam passes through an aperture 24 of the type described in my copending application entitled "Electron Beam Aperture Plate" and filed concurrently herewith, and is focused by the magnetic field forming an objective lens in a region 26. The region 26 is defined by a gap in a toroidal ferromagnetic shell 27 surrounding an objective lens coil 28.

After passing through the focusing field of the objective lens, the electron beam is further acted upon by a projection lens field in a gap 29 in a toroidal ferromagnetic shell 31 surrounding a projection lens coil 32. As is well known, additional electron lenses may be provided, if desired, but the present invention is independent of the number of such lenses. The projection lens further magnifies the electron image of the specimen, and this enlarged image is presented on a fluorescent screen 33 on the inner surface of a viewing window 34, which may be of the type more fully described in my copending application entitled "Viewing Window for Electron-Optical Devices" and filed concurrently herewith. The viewing window 34 is held in place by a clamping ring 36 which is secured to the end of the shell of the microscope 11.

The specimen holder is shown in greater detail in FIG. 2 which is a cross-section of the electron microscope 11 along the line 2—2 in FIG. 1. The specimen itself is supported on a gauze platform 37 which is located within a countersunk hole 38 which is bored perpendicularly through the axis of a cylindrical rod 39. While, in the embodiment shown, the rod 39 extends entirely through the body of the microscope 11 perpendicularly to the axis thereof, the rod may be made somewhat shorter, provided it is long enough to permit the region in which the countersunk hole 38 is located to be moved sufficiently. One limit of the range of motion, when the rod is in operating position within the body of the microscope, places the countersunk hole 38 on the axis of the microscope. The other limit, when the rod is withdrawn to change specimens, places the countersunk hole 38 outside of the microscope but with the left-hand end of the rod still inside the body of the instrument so that the vacuum chamber of the microscope is not opened. In this connection, the rod 39 is precision-ground so as to have a perfectly smooth, round cross-section and the gap between the exterior of the rod and the wall of the microscope 11 is sealed by a plurality of O-rings 40 and 41 which form extended sealing means to keep the interior of the microscope vacuum-tight. These O-rings are located within countersunk portions 42 and 43 of a hole bore through the body of the microscope 11 and are held in place by brackets 44 and 45 that are attached to the outer wall of the microscope by means of a plurality of bolts 46.

The right-hand bracket 44 serves as a support for the mechanism to adjust the location of the specimen when the microscope is in operation. This mechanism includes a base 47 and an outer member 48 which are attached to the bracket 44 by a pair of bolts 49, only one of which appears in FIG. 2. These bolts are removable to withdraw the rod 39 far enough to the right to change specimens. A sheet metal cover 51 cooperates with the base 47 and the outer member 48 to form a complete housing for the position-adjusting mechanism.

One end of the rod 39 is ground to a reduced diameter, as indicated by reference character 52, to extend through an opening in the base 47 which is ground to admit only the reduced diameter end 52 but which serves as a stop for the shoulder 53 on the rod 39. A gear segment 54 is attached to the end 52 of the rod 39 and is provided with a toothed surface 56.

The position of the specimen on the gauze support 37 in one direction perpendicular to the axis of the microscope 11 is determined by the longitudinal position of the rod 39 and this, in turn, is adjusted by means of a bolt 57 having a knurled head 58 and indicated as the "X-control." The end of the bolt 57 bears against the end 52 of the rod 39 to push the rod to the left, as indicated by the arrow 59. Opposing this is pressure from a spring 61 that bears against the gear segment 54 to urge the rod 39 to the right, as indicated by the arrow 62. The limit of movement in this direction is reached when the shoulder 53 presses against the surface of the base 47.

Movement of the specimen in the opposite direction, i.e. in a vertical direction as depicted in FIG. 2, is accomplished by a knurled "Y-control" knob 63. This knob is connected by means of a shaft to a pinion gear 64 within the housing and this gear, in turn, drives another gear 66 that is rigidly mounted on the same shaft 67 as a third gear 68. The latter meshes with the toothed surface 56 of the gear segment 54 to rotate the latter in response to rotation of the knob 63. The shaft 67 extends through the outer member 48 and a pointer 69 is located on it. This pointer indicates roughly the location of the specimen but more importantly it cooperates with a stop pin 71 to limit rotation of the rod 39.

FIG. 3 shows an end view of the housing of FIG. 2. Rotation of the Y-control knob 63 rotates the pinion gear 64 which rotates the larger gear 66 and the shaft 67. As the latter rotates, it moves the pointer 69 through almost a complete circle from the position shown, against one side of the stop pin 71, around to the other extreme position, against the opposite side of the stop pin. At the same time the gear 68 on the shaft 67 operates the gear segment 54 through the limited permissible angle and thus rotates the rod 39 through the same angle. This rod is shown with a section broken away to indicate the position of the gauze 37 with respect to the axis of the rod. As may be seen, the axis of the rod 39 does not pass through the gauze 37 and therefore, as the rod is rotated, the gauze 37 also rotates, as indicated by the arrow 72, but because of the fact that rotation of the rod is limited to only a few degrees, due to the fact that movement of the gear segment 54 is limited to the space between two stop surfaces 73 and 74, the position of the gauze 37 and hence of the specimen is practically the same as if it were moved in a vertical direction either upwardly or downwardly, depending on the direction of rotation of the knob 63.

While this invention has been described in terms of a specific embodiment, it will be understood by those skilled in the art that modifications may be made therein within the scope of the following claim.

What is claimed is:

A specimen holder for an electron microscope comprising a hollow, cylindrical body and an electron beam path along the axis thereof, said holder comprising: a round, cylindrical rod extending perpendicularly through said body with the axis of said rod crossing perpendicularly the axis of said body, said rod having a specimen hole therethrough perpendicular to the axis of said rod and located on the axis of said body approximately midway between the ends of said rod, one end of said rod extending outside of said body; a housing removably attached to said body and surrounding said end of said rod whereby said housing may be released from said body and said rod withdrawn sufficiently to bring said specimen hole outside of said body to change specimens without removing the other end of said rod from said body; a gear attached directly to said end of said rod; a control gear supported by said housing and coupled to said first-named gear to rotate said first-named gear through a limited angle; a pointer attached to said control gear to rotate therewith; a stop on said housing to engage said pointer to limit the rotation of said control gear; a specimen support surface located in said specimen hole at a point displaced from the axis of said rod to be moved in a direction substantially perpendicular to the axis of said cylindrical body when said control gear moves said first-named gear; a spring bearing on said housing and said first-named gear to push said rod longitudinally in one direction with respect to said cylindrical body; and a bolt threaded into said housing and pressing against said end of said rod to push said rod longitudinally in the opposite direction, whereby the longitudinal position of said rod is governed by the opposing pressures of said spring and said bolt to move said specimen support surface in a direction perpendicular to the axis of said cylindrical body and perpendicular to the first-mentioned direction of motion of said specimen support surface.

References Cited in the file of this patent
UNITED STATES PATENTS

| | | |
|---|---|---|
| 2,418,903 | Runge | Apr. 15, 1947 |
| 2,464,382 | Dornfeld | Mar. 15, 1949 |
| 2,510,349 | Reisner | June 6, 1950 |